Dec. 12, 1944.   G. FASSIN   2,364,627
ROTARY SLIDE CARRIER
Filed Jan. 15, 1942
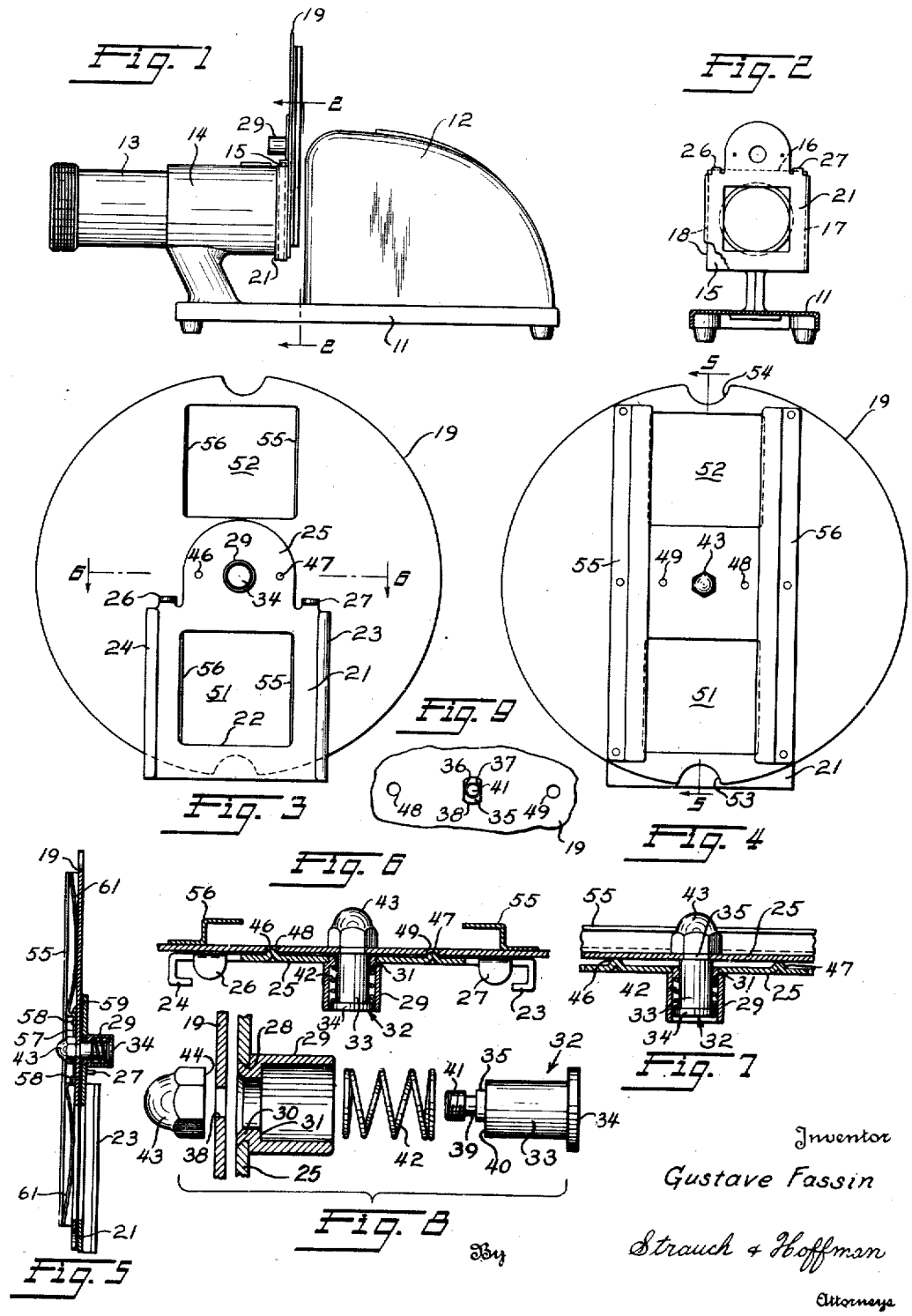
Inventor
Gustave Fassin
By Strauch & Hoffman
Attorneys Patented Dec. 12, 1944

2,364,627

UNITED STATES PATENT OFFICE 2,364,627

ROTARY SLIDE CARRIER

Gustave Fassin, Grosse Pointe, Mich., assignor to International Industries, Inc., Ann Arbor, Mich., a corporation of Michigan Application January 15, 1942, Serial No. 426,908

7 Claims. (Cl. 88—27)

This invention relates to picture projection apparatus and is more particularly concerned with rotary picture slide carriers for projection apparatus.

It is a major object of my invention to provide projection apparatus having a demountable rotatable slide carrier of novel simple and inexpensive construction which is easily and accurately fitted to the projection apparatus to permit accurate projection and speedy changing of the picture slide to be projected.

It is a further object of my invention to provide a rotary picture slide carrier assembly having a novel socket arrangement for attaching it to a projector.

A further object of my invention is to provide a novel rotary slide carrier having improved means for releasably holding slides thereon.

A further object of my invention is to provide a rotary slide carrier assembly wherein novel arrangements are provided for yieldably holding the rotatable slide carrier against accidental movement from predetermined positions.

It is a further object of my invention to provide a rotary slide carrier assembly having a novel yieldable hub construction.

Further objects of the invention will presently appear as the description proceeds in connection with the appended claims and the annexed drawing in which:

Figure 1 is a side elevational view of the rotary slide carrier of the invention mounted on a projector.

Figure 2 is an end elevation partly in section taken along the line 2—2 of Figure 1 illustrating how the slide carrier socket device is fitted with the projector lens tube support sleeve.

Figure 3 is an elevation illustrating one side of the demountable rotary slide carrier assembly.

Figure 4 is an elevation illustrating the opposite side of the slide carrier assembly from Figure 3, and showing the slide holder arrangements.

Figure 5 is a section taken along line 5—5 in Figure 4, illustrating the hub, socket and slide holder construction.

Figure 6 is an enlarged sectional view illustrating the manner in which the slide carrier disc is held against accidental rotation on the support socket.

Figure 7 is similar to Figure 6, illustrating the parts relatively angularly displaced to show the camming action of the holding projections on the slide carrier disc as the disc is rotated to present a substitute slide in the light path.

Figure 8 is an exploded view of the yieldable hub construction; and

Figure 9 is a fragmentary elevation, similar to Figure 4, illustrating the slide carrier hub with the retaining nut removed to show the non-rotatable connection between the hub axle and the rotatable slide carrier disc.

Referring to the drawing, the projector to which the socket of the rotary slide carrier assembly of the invention is especially adapted comprises a base 11 supporting a lamp house 12 and a lens tube 13 axially slidable in a supporting sleeve 14 rigid with base 11.

At its rear end, adjacent lamp house 12, sleeve 14 is formed to an outwardly extending circumferential formation defining a substantially rectangular socket member 15 having a horizontal top wall 16 and parallel vertical side guide walls 17 and 18. Socket member 15 is designed to locate and firmly support the rotary slide carrier assembly to be described below in operative position on the projector.

Referring to Figures 3–9, my novel rotary slide carrier assembly comprises a slide carrier plate or disc 19 rotatably supported on a socket member 21 by a special axially yieldable hub construction which permits selective rotation of the disc to interchange the slide in the light path. While slide carrier 19 is preferably circular, it may be of any selected shape without departing from the spirit of the invention.

Socket member 21 is preferably made from an integral blank of relatively stiff sheet metal formed with a rectangular picture framing window 22 located equi-distantly between forwardly and inwardly bent side walls 23 and 24 which form opposed guide channels spaced to embrace and snugly interfit with side walls 17 and 18 of the socket member 15 on sleeve 14.

Above window 22, socket member 21 is formed with a rounded integral projection 25. At its lower end, projection 25 is flanked by forwardly bent integral tabs 26 and 27 arranged at the same level and having flat under surfaces adapted to rest on top wall 16 of socket member 15. Tabs 26 and 27 are so spaced vertically with respect to window 22 that they support and locate socket member 21 on the projector with window 22 optically centered vertically with lens tube 13. Channels 23 and 24 locate window 22 horizontally centrally in the light path, and have such good friction fit with socket member 15 as to insure that socket member 21 is non-rotatably mounten on sleeve 14.

Above window 22, and vertically aligned with the optical center of window 22, projection 25 is substantially centrally provided with a relatively small circular aperture 28 (Figure 8). A short hollow rigid cylindrical hub member 29 projects forwardly from socket member 21 and is formed at its rear end with a reduced diameter end collar 30 providing an internal annular shoulder 31. Hub 29 is rigidly and non-rotatably secured to socket member 21 concentric with aperture 28. As shown in Figures 6-8, collar 30 extends into aperture 28 and is preferably brazed over within aperture 28 at the opposite side, although any equivalent securing means such as soldering, welding or the like may be employed. An equivalent alternative construction is to make hub member 29 integral with projection 25, although I have discovered that the two-part construction above described is less expensive and easier to manufacture.

A short shaft or spindle 32 having a cylindrical shank 33 of such diameter as to fit freely rotatably and slidably within collar 30 extends axially through hub 29. Shaft 32 is formed with a shallow enlarged cylindrical head 34 of such diameter as to fit freely rotatably and slidably within hub 29, and is formed beyond shank 32 with a short reduced non-circular portion 35 shaped to non-rotatably fit within a similarly shaped aperture in the central portion of disc 19 in the assembly.

Referring to Figure 9, reduced shaft portion 35 is preferably formed by first cutting down the diameter of a section of the inner end of shank 33 and then cutting sectors from diametrically opposite sides of that section to provide parallel flat sides 36 and 37, so that the perimeter of shaft portion 35 comprises a four-sided figure having two parallel opposite side walls and two oppositely curved end walls. While this shape is preferred, it is not essential, and shaft portion 35 may comprise any non-rotatable connection with disc 19 suitable for purposes of the invention.

Inwardly of portion 35, shaft 32 is formed with a still further reduced section 39 preferably of predetermined length, and terminates in a short threaded section 41 having slightly greater diameter than section 39.

As shown in Figures 6 and 7, the yieldable hub assembly includes a cylindrical coiled compression spring 42 which surrounds shank 33 and extends between shoulder 31 and the inner surface of button 34. Non-circular shaft portion 35 extends into a correspondingly shaped central aperture 38 in disc 19. The length of shaft portion 35 axially of shaft 32 is substantially equal to the thickness of the metal surrounding aperture 38 in disc 19. Thus radial shoulder 40 on the inner end of shank 33 is a stop shoulder limiting rearward axial displacement of shaft 32 relative to socket member 21. Shaft sections 39 and 41 project forwardly beyond disc 19 opposite hub 29.

A suitable nut 43 threaded engages section 41 of shaft 32. Nut 43 may be of any desired shape but preferably is rounded as shown for sake of appearance and to eliminate sharp corners.

Shaft section 39 is of such length and threaded section 41 has such threaded engagement with nut 43 that when nut 43 is turned until tight with shaft 32, the inner flat face 44 of nut 43 is axially spaced a substantial distance from reduced shaft portion 35. As nut 43 is drawn tight in assembling the hub, surface 44 turns flush with the adjacent surface of disc 19, and shaft 32 is pulled inwardly of the hub against the compression of spring 42. When nut 43 has been drawn up to its limit shaft 32 lies within hub 29 with button 34 located just within the end of the hub and with its outer face substantially flush with the outer edge of the hub. Button 34 therefore provides a closure for the forward end of hub 29, preventing entry of dirt therein and presenting a neat appearance.

The dimensions of the various sections of shaft 32 are such that, when nut 43 is drawn tight as above described, spring 42 is materially compressed, and shaft 32 has a predetermined amount of axial play relative to socket member 21 against the compression of spring 42. Shaft 32 is urged axially forwardly by spring 42 and nut face 44 serves as a stop limiting forward axial movement of shaft 32 relative to disc 19. Contact of disc 19 with projection 25 limits forward displacement of shaft 32 relative to socket member 21.

Shaft 32 is non-rotatably secured to disc 19, and therefore rotatably supports disc 19 on hub 29 of socket member 21. Shaft 32 is rotatably supported on axially spaced bearings in hub 29, at collar 30 and at button 34. This arrangement supports shaft 32 against angular displacement relative to the axis of hub 29, while permitting free axial and rotative movement of the shaft within the hub.

At opposite sides of hub 29 and in horizontal alignment with the axis of rotation of shaft 32, socket member 21 is formed with integral teeth or detents 46 and 47 adapted to extend within suitably shaped recesses or apertures 48 and 49 of disc 19 when disc 19 has been rotated to a predetermined position on the socket. Apertures 48 and 49 are preferably located on a horizontal diameter passing through the center of rotation of disc 19 within aperture 38. Detents 46 and 47 are preferably formed by striking out the material of extension 25 from the reverse side although they may comprise small rivets or similar formations on the socket, or on disc 19 as desired.

Disc 19 is preferably a thin rigid metal disc having a pair of diametrically opposite rectangular picture framing apertures 51 and 52 of the same size equi-distantly spaced from the axis of rotation of the disc. The sides of apertures 51 and 52 are parallel, and the apertures are vertically aligned during projection.

The flat sides of aperture 38 are preferably vertically disposed parallel to the vertical sides of apertures 51 and 52 and perpendicular to the diameter containing apertures 48 and 49 so that disc 19 can be properly and accurately assembled with socket member 21 and shaft 32. In the assembly spring 42 holds disc 19 seated on shaft portion 35.

With the slide carrier assembly mounted on the projector apertures 51 and 52 may be quickly interchanged behind window 22 simply by rotating disc 19 through 180°. Projections 46 and 47 cooperate with apertures 48 and 49 to retain disc 19 against accidental rotation when a slide is being inserted before upper aperture 52 while lower aperture 51 is in the path of projection, but the exertion of sufficient force tending to rotate disc 19 will cause projections 46 and 47 to cam out of the corresponding apertures in the disc, this operation being permitted by the above-described permissible axial play in shaft 32. Figure 7 illustrates disc 19 in an intermediate position of rotation wherein shaft 32 has been displaced inwardly of hub 28 until button 34 is well within the hub, and disc 19 is separated from the socket member a distance equal to the height of the projections 46 and 47. Thus the permissible axial play of shaft 32 relative to socket member 21 is at least equal to the height of projections 46 and 47 and is preferably somewhat larger. Upon reaching either 180° position, the force of spring 42 is sufficient to snap the disc toward socket 21, projections 46 and 47 entering into the corresponding disc apertures so as to again releasably lock the disc and socket together.

Disc 19 is formed with diametrically opposite peripheral finger notches 53 and 54 adjacent apertures 51 and 52 affording means for gripping the disc 19 for rotation.

For holding slides before apertures 51 and 52 on the slide carrier disc, I provide on the opposite side of the disc from socket member 21 a pair of elongated parallel vertical guide bars 55 and 56 which are preferably riveted to disc 19 and flank opposite sides of apertures 51 and 52. Bars 55 and 56 define opposed rectangular channels into which picture slides may be inserted from the top into position before aperture 52, while a picture slide at aperture 51 is being projected.

For limiting radially inward movement of the picture slides in channels 55 and 56, and for holding the slide before lower aperture 51 from dropping out, I provide each of channels 55 and 56 with an elongated narrow strip 57 of thin spring metal which has its central portion secured flatly, as by rivet 58, to disc 19. Inwardly of apertures 51 and 52, each strip 57 is bent at right angles away from disc 19 as far as permitted by the adjacent guide bar to provide substantially horizontal stop walls 59. From each wall 59, each strip 57 extends within the channel toward the circumference of disc 19 and is formed with an inwardly bowed section 61, thereby providing a slide contacting spring within the channel at each side of disc apertures 51 and 52.

When it is desired to use the rotary slide carrier assembly with the projector of Figure 1, socket member 21 is simply fitted over cooperating socket member 15 and allowed to drop until tabs 26 and 27 contact wall 16. The carrier assembly is now correctly and operatively mounted on the projector.

A picture bearing slide is inserted into the top of the guideway formed by bars 55 and 56 until its lower edge rests on stop walls 59. During this operation springs 61 at opposite sides of aperture 52 flatten more or less according to the thickness of the slide. A picture slide is now properly registered before aperture 52. Disc 19 is then rotated through 180° to locate aperture 52 and its associated slide in registry with window 22 in the light path between lamp house 12 and lens tube 13. Springs 61 are of sufficient strength to frictionally keep the slide before aperture 52 from dropping out during projection. Rotation of disc 19 to bring aperture 52 into the light path simultaneously brings aperture 51 up above the projector to a position where the next slide to be projected can be inserted before aperture 51. These operations are repeated as often as desired.

Although the illustrated disc 19 has provision for only two slides, any desired number of slide apertures may be provided thereon without departing from the invention.

Spring 42, while of sufficient power to firmly hold disc 19 non-rotatable on socket 21 during projection, permits disc 19 to be readily rotated for exchanging slides. Disc 19 may be rotated in either direction in the above construction with the same result. My novel yieldable hub construction automatically insures proper and positive registry of each slide to be projected in the light path.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination with a rotary slide carrier plate having a pair of diametrically opposite picture projection apertures, a pair of parallel bars extending substantially completely across said plate and each of said bars extending along a side of both of said apertures; said bars defining slide holding guides at opposite sides of said apertures, and a strip of spring metal extending substantially the length of each guide, each strip having its intermediate portion secured to said plate and its ends bowed to provide slide holding springs at opposite sides of each aperture.

2. In a rotary slide carrier assembly, a support having a rigid hollow hub, a shaft rotatably and slidably mounted in said hub, a spring within the hub surrounding said shaft, a non-circular portion on said shaft projecting beyond said support on the side opposite said hub, a slide carrier plate fitted on said non-circular portion so as to be rotatable with said shaft, a threaded end section on said shaft spaced from said non-circular portion and a fastening element on said end section.

3. A rotary slide carrier assembly for a projector comprising a slide carrying disk; a support member pivotally connected to said disk for rotation relative thereto; spring engaged positioning means operating between said disk and said support member; said support including a slide frame having parallel guideways engageable with a fixed portion of a projector and permanent stops associated with said guideways and adapted to cooperate with said projector and accurately position said slide carrier assembly thereto.

4. A slide carrier assembly as defined in claim 3, wherein said support is provided with a window opening therethrough and said projector engaging guideways are located one at each side of said window opening, and said slide carrying disk is provided with window openings registrable with the window opening in said support and provided with slide supporting channels one at each side of two opposite sides of said window opening.

5. A slide carrier assembly as defined in claim 3, wherein said support member comprises an integral member of formed sheet metal having a window opening therethrough and parallel channels formed one at each side of two opposite sides of said window opening forming said guideways.

6. A slide carrier assembly as defined in claim 3, wherein said support member comprises an integral member of formed sheet metal having a window opening therethrough, and said guideways comprise parallel channels formed one at each of two opposite sides of said window opening, and said permanent stops comprise bent over lugs at the upper ends of said channels providing fixed positioning stops for said support.

7. In a rotary slide carrier assembly for a projector, a disk member having a plurality of circumferentially spaced windows; means on said disk member for holding slides in registry with each of said windows; a support member having a single window therein of a size comparable to the windows of said disk member; pivot means mounting said disk member on said support member for relative axial movement toward and away from said support member, said pivot means also mounting said members for rotation to bring any one of the windows in said disk member into registry with the window of said support member; resilient means operably associated with said pivot means constantly urging said slide member toward said support member, one of said members having a plurality of circumferentially spaced, open-sided recesses facing toward the other of said members, said other member having a plurality of detents permanently and rigidly provided thereon and projecting axially toward said one member, said detents being so located with respect to the pivotal axis and so spaced circumferentially as to cooperate in seating engagement with the recesses of said one member and yieldingly lock said members in any one of a plurality of selected adjusted relative angular positions, with said window in said support disposed in registry with one of the windows of said disk member, said detents and recesses being so shaped that when said members are relatively rotated in either direction said detents will ride out of said recesses and cam said members apart against the action of said resilient means, said one member having a smooth circular surface joining said recesses and disposed normal to the pivotal axis, upon which said detents are operable to ride when said members are relatively rocked from one selected adjusted angular position to another.

GUSTAVE FASSIN.

CERTIFICATE OF CORRECTION.

Patent No. 2,364,627.  December 12, 1944.

GUSTAVE FASSIN.

It is hereby certified that the above numbered patent was erroneously issued to "International Industries, Inc., of Ann Arbor, Michigan, a corporation of Michigan" as assignee whereas said patent should have been issued to --Argus, Incorporated, a corporation of Michigan-- as assignee of the entire interest therein, as shown by the records of assignment in this office; page 3, second column, line 55, claim 3, after "assembly" insert --relative--; and that the said Letters Patent should be read with this correction therein that the same may conform to the record of the case in the Patent Office.

Signed and sealed this 20th day of March, A. D. 1945.

Leslie Frazer (Seal)  Acting Commissioner of Patents.

integral member of formed sheet metal having a window opening therethrough, and said guideways comprise parallel channels formed one at each of two opposite sides of said window opening, and said permanent stops comprise bent over lugs at the upper ends of said channels providing fixed positioning stops for said support.

7. In a rotary slide carrier assembly for a projector, a disk member having a plurality of circumferentially spaced windows; means on said disk member for holding slides in registry with each of said windows; a support member having a single window therein of a size comparable to the windows of said disk member; pivot means mounting said disk member on said support member for relative axial movement toward and away from said support member, said pivot means also mounting said members for rotation to bring any one of the windows in said disk member into registry with the window of said support member; resilient means operably associated with said pivot means constantly urging said slide member toward said support member, one of said members having a plurality of circumferentially spaced, open-sided recesses facing toward the other of said members, said other member having a plurality of detents permanently and rigidly provided thereon and projecting axially toward said one member, said detents being so located with respect to the pivotal axis and so spaced circumferentially as to cooperate in seating engagement with the recesses of said one member and yieldingly lock said members in any one of a plurality of selected adjusted relative angular positions, with said window in said support disposed in registry with one of the windows of said disk member, said detents and recesses being so shaped that when said members are relatively rotated in either direction said detents will ride out of said recesses and cam said members apart against the action of said resilient means, said one member having a smooth circular surface joining said recesses and disposed normal to the pivotal axis, upon which said detents are operable to ride when said members are relatively rocked from one selected adjusted angular position to another.

GUSTAVE FASSIN.

CERTIFICATE OF CORRECTION.

Patent No. 2,364,627.    December 12, 1944.

GUSTAVE FASSIN.

It is hereby certified that the above numbered patent was erroneously issued to "International Industries, Inc., of Ann Arbor, Michigan, a corporation of Michigan" as assignee whereas said patent should have been issued to --Argus, Incorporated, a corporation of Michigan-- as assignee of the entire interest therein, as shown by the records of assignment in this office; page 3, second column, line 55, claim 3, after "assembly" insert --relative--; and that the said Letters Patent should be read with this correction therein that the same may conform to the record of the case in the Patent Office.

Signed and sealed this 20th day of March, A. D. 1945.

Leslie Frazer (Seal)    Acting Commissioner of Patents.